US010857672B2

(12) United States Patent
Lee et al.

(10) Patent No.: US 10,857,672 B2
(45) Date of Patent: Dec. 8, 2020

(54) REAL-TIME DEVICE CONTROL SYSTEM HAVING HIERARCHICAL ARCHITECTURE AND REALTIME ROBOT CONTROL SYSTEM USING SAME

(71) Applicant: RAINBOW ROBOTICS, Daejeon (KR)

(72) Inventors: Jung Ho Lee, Daejeon (KR); Jeong Soo Lim, Daejeon (KR)

(73) Assignee: RAINBOW ROBOTICS, Daejeon (KR)

( * ) Notice: Subject to any disclaimer, the term of this patent is extended or adjusted under 35 U.S.C. 154(b) by 267 days.

(21) Appl. No.: 15/762,063

(22) PCT Filed: Jul. 22, 2016

(86) PCT No.: PCT/KR2016/008037
§ 371 (c)(1),
(2) Date: Mar. 21, 2018

(87) PCT Pub. No.: WO2017/052060
PCT Pub. Date: Mar. 30, 2017

(65) Prior Publication Data

US 2018/0229367 A1 Aug. 16, 2018

Related U.S. Application Data

(60) Provisional application No. 62/221,215, filed on Sep. 21, 2015.

(30) Foreign Application Priority Data

Feb. 22, 2016 (KR) ........................ 10-2016-0020776

(51) Int. Cl.
*B25J 9/16* (2006.01)
*G06F 9/54* (2006.01)
(Continued)

(52) U.S. Cl.
CPC .......... *B25J 9/1656* (2013.01); *B25J 9/0084* (2013.01); *B25J 9/161* (2013.01); *B25J 9/1602* (2013.01);
(Continued)

(58) Field of Classification Search
None
See application file for complete search history.

(56) References Cited

U.S. PATENT DOCUMENTS

| | | | | |
|---|---|---|---|---|
| 9,306,434 | B2 * | 4/2016 | Ueda | B25J 9/10 |
| 2005/0240412 | A1 | 10/2005 | Fujita | |

(Continued)

FOREIGN PATENT DOCUMENTS

| | | | |
|---|---|---|---|
| JP | 2002-187082 | A | 7/2002 |
| KR | 10-2009-0041997 | A | 4/2009 |

(Continued)

*Primary Examiner* — Craig C Dorais
(74) *Attorney, Agent, or Firm* — Novick, Kim & Lee, PLLC; Sang Ho Lee

(57) ABSTRACT

Provided is a real-time robot controlling system which includes a first layer comprising one or more control target devices; a second layer comprising a device control module controlling directly the devices at upper level of the first layer; a third layer comprising a shared memory connected to the device control module at upper level of the second layer; a fourth layer comprising one or more agents performing independent processes using the shared memory at upper level of the third layer; and a fifth layer controlling the one or more agents according to user commands at upper level of the fourth layer.

11 Claims, 7 Drawing Sheets

(51) Int. Cl.

| | |
|---|---|
| ***B25J 9/00*** | (2006.01) |
| ***B25J 19/02*** | (2006.01) |
| ***G05B 19/042*** | (2006.01) |

(52) U.S. Cl.

CPC ........... *B25J 9/1661* (2013.01); *B25J 9/1664* (2013.01); *B25J 9/1694* (2013.01); *B25J 19/02* (2013.01); *G05B 19/042* (2013.01); *G06F 9/544* (2013.01); *G06F 9/545* (2013.01); *Y10S 901/08* (2013.01); *Y10S 901/46* (2013.01)

(56) References Cited

U.S. PATENT DOCUMENTS

| | | | | |
|---|---|---|---|---|
| 2007/0168082 | A1 | 7/2007 | Kim et al. | |
| 2009/0254217 | A1 | 10/2009 | Pack et al. | |
| 2010/0280661 | A1 | 11/2010 | Abdallah et al. | |
| 2014/0336818 | A1* | 11/2014 | Posselius ............. | G05D 1/0297 700/248 |

FOREIGN PATENT DOCUMENTS

| | | | |
|---|---|---|---|
| KR | 10-2012-0015045 | A | 2/2012 |
| KR | 10-1275020 | B1 | 6/2013 |

* cited by examiner

REAL-TIME DEVICE CONTROL SYSTEM HAVING HIERARCHICAL ARCHITECTURE AND REALTIME ROBOT CONTROL SYSTEM USING SAME

TECHNICAL FIELD

The present invention relates to a real-time device controlling system and a real-time robot system, and more specifically, to a real-time device controlling system having a hierarchical architecture and a real-time robot controlling system using the same that enables an exact real-time process, facilitates easy development and debugging, and have strong hardware.

BACKGROUND ART

Researches on robot are vividly implemented in a number of authorities domestic and abroad currently. A robot can be divided largely into hardware and software, which may be integrated to realize one system.

Elements constructing robot hardware may include driver and controller for moving robot joint, battery and power source controller, communication module, sensors, exoskeleton of robot, electronic circuit, battery and so on. A robot hardware platform may be formed by combining elements of these various sorts as wanted properties of each of robots.

And each of elements are further different each other in size, appearance, performance, manufacturer and the like according to design object, by which robot hardware platforms of infinite sorts may be produced as a result. Actually, a vast variety of robots exist all over the world. Therefore, researches surveying performance and functions of robot platforms having common object to develop one representative standard type robot platform are under progressing all over the world.

And, like there are researches in a direction of developing a standard type robot platform in hardware field as described above, there are researches on standard type robot software usable in common in software field. There exist a variety of kinds of software such as software for controlling robot devices such as drive controller or sensors belonging into robot hardware, software for helping easy development of robot motion, software determining relationship among tasks to help operation of robot, software providing navigation or vision solution and the like, and the development of standard type software is under progressing under a similar object to that of the development of standard type hardware.

However, in the development of the standard type software, providing a standard solution for settling common requirements of plenty of developers is actually difficult.

Especially, not only co-work between developers may get harder as changed matters in hardware gets more, but also problems that processes overlap by functions or processes simultaneously developed by a plurality of persons may generated. Accordingly, there may be problems that real-time synchronization is difficult, hardware stability or toughness is decreased, and development time becomes longer.

And, there may be problems that driving performance is decreased since additional function change should be added to maintain compatibility with the standard software in hardware development.

DISCLOSURE

Technical Problem

The present invention is to solve the problem as described above, an object of which is to provide a real-time device controlling system having hierarchical architecture and a real-time robot controlling system using the same that a plurality of independent processes with respect to the same hardware control and process can coexist, operation of robot according to the same can be controlled stably, and the toughness and expandability thereof can be provided in a robot controlling system needing real-time features.

Technical Solution

A system according to an embodiment of the present invention to settle the problem as described above is a real-time device controlling system comprising a first layer comprising one or more control target devices; a second layer comprising a device control module controlling directly the devices at upper level of the first layer; a third layer comprising a shared memory connected to the device control module at upper level of the second layer; a fourth layer comprising one or more agents performing independent processes using the shared memory at upper level of the third layer; and a fifth layer controlling the one or more agents according to user commands at upper level of the fourth layer.

And, a system according to an embodiment of the present invention to solve the problem as described above is a real-time robot controlling system comprising one or more control target devices corresponding to a joint or a sensor of a robot; and a control system connected to the one or more control target devices to operate the devices, wherein the control system comprising a first layer comprising the one or more control target devices; a second layer comprising a device control module controlling directly the devices at upper layer of the first layer; a third layer comprising a shared memory connected to the device control module at upper layer of the second layer; a fourth layer comprising one or more agents performing independent processes using the shared memory at upper layer of the third layer; and a fifth layer controlling the one or more agents according to user commands at upper layer of the fourth layer, to operate the one or more devices using communication between the layers mutually adjacent to each other.

On the other hand, a method to solve the problem as described above can be realized as a program for executing the method on a computer and a recording medium recording the program.

Advantageous Effects

According to an embodiment of the present invention, by providing a plurality of agents having mutually independent processes and a shared memory where references generated according to operation of the plurality of agents stored and by providing a separate device control module controlling the hardware devices using the references, a plurality of independent processes can coexist with respect to the same hardware control in a robot controlling system needing real-time features, by which operation of robot can be controlled with stability.

According to an embodiment of the present invention, even though each of agents may be developed independently, synthesis and selection of reference may be enabled through the shared memory, by which possibility of mutual collision can be reduced and strong real-time features can be secured. And, agent substitution, real-time debugging and the like at the time of error occurrence can be facilitated, by which co-work convenience and expandability can be drawn.

And, according to an embodiment of the present invention, an effect that a stabilized and systematic system can be maintained through a controlled system by providing a hierarchical architecture among each of devices, a device control module, a shared memory and agents.

BEST MODE

Figure 1:
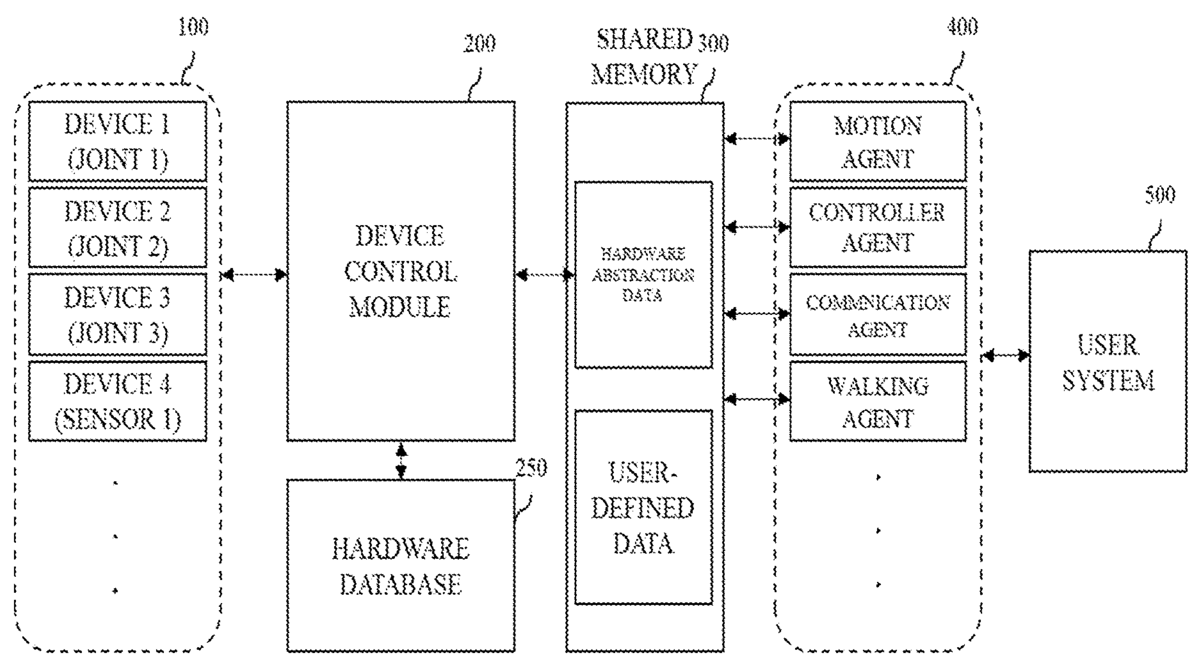
FIG. 1 is a conceptual diagram showing schematically the whole system according to an embodiment of the present invention.

Hereinafter, the only principle of the present invention will be illustrated. Therefore, a person in the art may be able to invent a variety of apparatus included in the concept and range of the present invention by realizing the principle of the present invention even though clarity may not be described or shown in the specification. And, all the conditional terms and embodiments listed in the specification are in principle intended clearly only for the purpose of appreciation of concept of the present invention, which should be understood not to be restrictive to such an especially listed embodiments and status.

And, all the detailed description listing specific embodiments as well as principle, viewpoint, and embodiments of the present invention should be understood as to be intended to include structural and functional equivalents of these matters. And, these equivalents should be appreciated to include equivalents developed in the future, that is all the elements invented to perform the same function regardless of structure, as well as equivalents known public currently.

Accordingly, for example, block diagrams of the present specification should be appreciated as to show conceptual viewpoint of indicative circuit realizing the principle of the present invention. Similarly, all the flow chart, status conversion diagram, pseudo code and the like may be shown actually in a computer-readable medium and should be understood to show a variety of processes performed by computer or processor regardless of whether the computer or processor is depicted clearly or not.

Functions of a variety of elements shown in drawings including function blocks expressed as processor or a similar concept thereto may be provided not only by exclusive hardware but also by usage of hardware in relation to a proper software having ability to execute software. When provided by a processor, the function may be provided by a single exclusive processor, a single shared processor or a plurality of individual processors, among which a unit may be shared.

And, clear usage of terms suggested as a processor, a control or a concept similar thereto should not be interpreted with exclusive citation of hardware having ability to execute software but should be appreciated to suggestively include digital signal processor (DSP) hardware, ROM, RAM and non-volatile memory to store software without limitation. And another well-known or commonly used hardware may be included.

The constructing elements in claims of the present specification expressed as means for performing functions written in the detailed description are intended to include all the method performing functions including software of all the type including, for example, combination of circuit elements perform the functions, firmware/microcode or the like, which may be coupled to a proper circuit to execute the software to perform the function. In the present invention defined by such a claim, the functions provided by the means listed in variety may be coupled each other and may be coupled in a way required from the claim, by which any means capable of providing the function should be understood as equivalent to that comprehended from the present specification.

The objects, features and merits described above may become clearer through following detailed description related to attached drawings, according to which a person having an ordinary knowledge in the technical field where the present invention pertains may be able to implement the technical idea of the present invention with ease. And, in case that detailed explanation on a publicly known technology related to the present invention may be determined to blur the gist of the present invention unnecessarily in the description of the present invention, the detailed description may be omitted.

Hereinafter, a desirable embodiment according to the present invention will be described in detail in reference to attached drawings.

FIG. 1 is a conceptual diagram showing schematically the whole system according to an embodiment of the present invention.

Referring to FIG. 1, the whole system according to an embodiment of the present invention may include one or more devices 100, a device control module 200, a shared memory 300, one or more agents 400 and a user system 500.

The devices 100 may include one or more drive apparatus finally performing operation of the robot controlling system. The drive apparatus may include hardware apparatus or software apparatus. The drive apparatus may include at least one of, for example, a joint device controlling drive with respect to a joint motor, a sensor device including a sensor board, or simulator apparatus.

And, the devices 100 may be controlled according to control signals received from the device control module 200 and may output a variety of data such as sensor data to the device control module 200. And, the term of devices 100 herein is not limited to hardware but can be used as concept including software driver for driving actual hardware device. Therefore, each of the devices 100 may be connected to the device control module 200 physically and in software.

And, each of devices 100 may form a communication network with the device control module 200. The communication network may form a system network using a protocol of CAN (Controller Area Network) method for system stability.

For example, each of device 100 may be connected to the device control module 200 in one or more CAN communication channels and may receive a message constructed with CAN frame data or may output a message to the device control module 200 according to control period pre-set through the CAN communication channel. Here, the message may include motor control reference, encoder value, controller status value, PWM (Pulse Width Modulation) command, sensor value or a variety of other settings or output values.

And, the device control module 200 may obtain hardware control data for control of the one or more devices 100 from each of references generated from the plurality of agents 400 and stored into the shared memory and may transfer control signals according to the references to the one or more devices 100 selected from the hardware control data.

The device control module 200 may reside always on an operating system for control of the robot controlling system to be executed in background.

The device control module 200 may communicate directly to the devices 100 solely in reference with the shared memory 300 and may transfer control signals or may receive sensor signals through the communication channel.

For example, the device control module 200 may transfer a reference for control of the joint device 100 or may receive sensor information needed from the sensor device 100.

And, the device control module 200 may include a real-time thread generated on the operating system. And, the thread may enable real-time processes by synchronization to a motion generating operation period of the system. And, the device control module 200 may further include a non-real-time thread for processes of data reading, convert and the like.

And, the plurality of agents 400 may be realized by independent software modules having mutually independent processes. For example, the agents 400 may process different motions to each other, and may perform processes for outputting references corresponding to the same. For example, each of the agents 400 may include a motion agent, a controller agent, a communication agent or a walking agent, a damping agent, and other variety of agents.

Since the processes are separated functionally in the agents 400 as described above, heap, data and static memory are not shared for each of thread to be generated to operate, and each of needed data for mutual share may be provided to the shared memory 300, by which an organic process without mutual collision may be enabled and software development and process may be enabled with ease.

Especially, according to an embodiment of the present invention, the plurality of agents 400 may refer to sensor data from the shared memory 300 according to operation of mutual independent processes, and according to an embodiment of the present invention, each of the agents 400 may refer to hardware abstraction data and user-defined data of the shared memory 300 according to each of defined processes, and may store reference data generated based on the same to hardware abstraction data of the shared memory 300.

Here, the user-defined data may include a shared data for information share between the agents 400 and a variety of data for other system drive which user-definition allowed.

And, the hardware abstraction data may include references, sensor data, motion owner variable and command data abstracted for control of the devices 100. And, the device control module 200 may generate control signals by each of devices 100 using the hardware abstraction data and hardware information stored in a hardware database 250 in advance.

Accordingly, the device control module 200 may identify the control target devices 100, may generate control signals with respect to the control target devices 100, and may output control signals according to the references to the control target devices 100 using the hardware abstraction data extracted from the shared memory 300.

And, for guarantee of strong real-time features, there is a need that process period of each of agents 400 is shorter than operation period processing motion information of the system. Accordingly, the time at which the agents 400 may generate references from sensor data, the device control module 200 may generate and output control signals from the references through shared memory 300, and sensor data is updated may be included within a first operation period of the system. Therefore, the series of operations may be all processed within the first operation period.

On the other hand, the user system 500 may provide a user interface for controlling and monitoring the agents 400 and the device control module 200. And, the user system 500 may include middleware for control of the agents 400 and may provide a variety of interfaces which can be connected to other external system.

Figure 2:
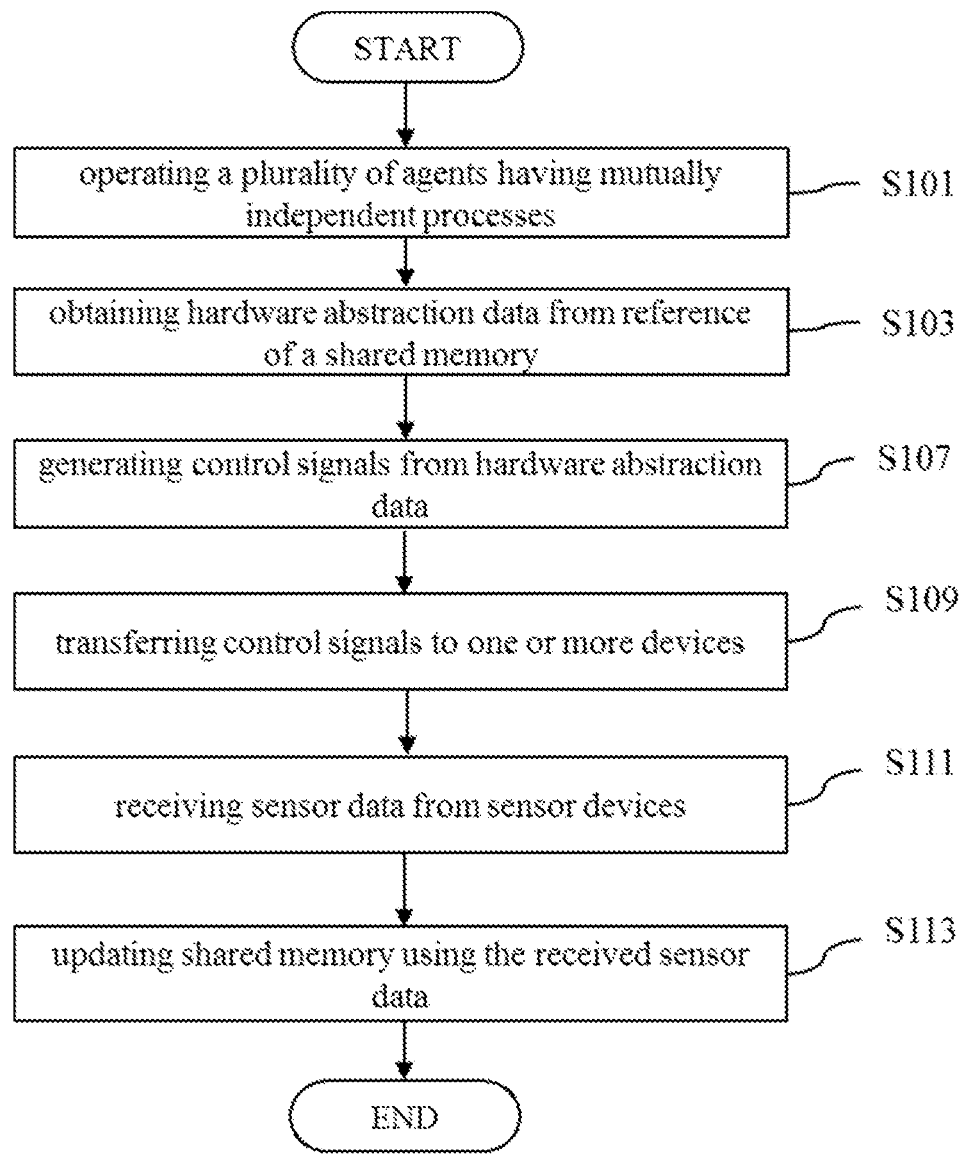
FIG. 2 is a flow chart for explaining control method of robot controlling system according to an embodiment of the present invention.

FIG. 2 is a flow chart for explaining control method of robot controlling system according to an embodiment of the present invention.

Figure 3:
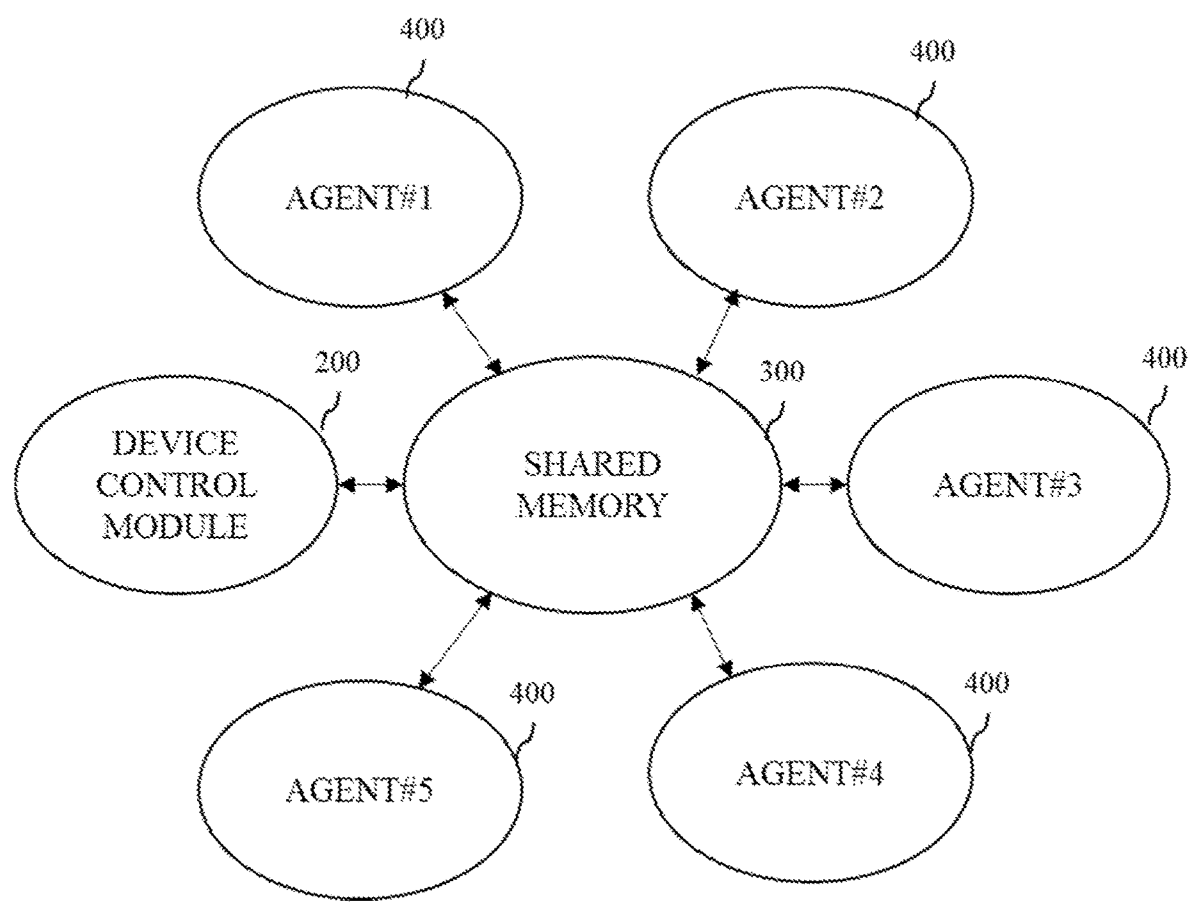
FIG. 3 and FIG. 4 are diagrams for explaining relationship between the shared memory and the system according to an embodiment of the present invention.
Figure 4:
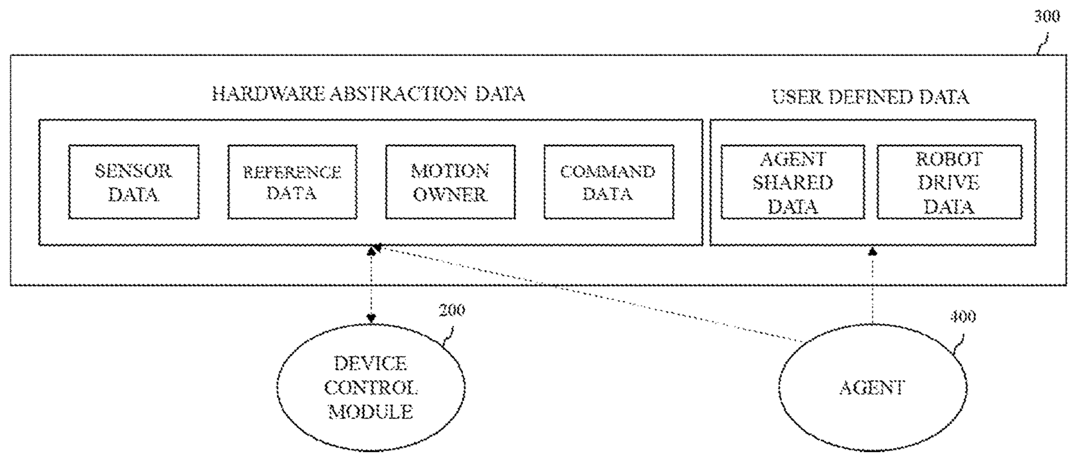

And, FIG. 3 and FIG. 4 are drawings for explaining relationship between the shared memory and the system according to an embodiment of the present invention.

Figure 5:
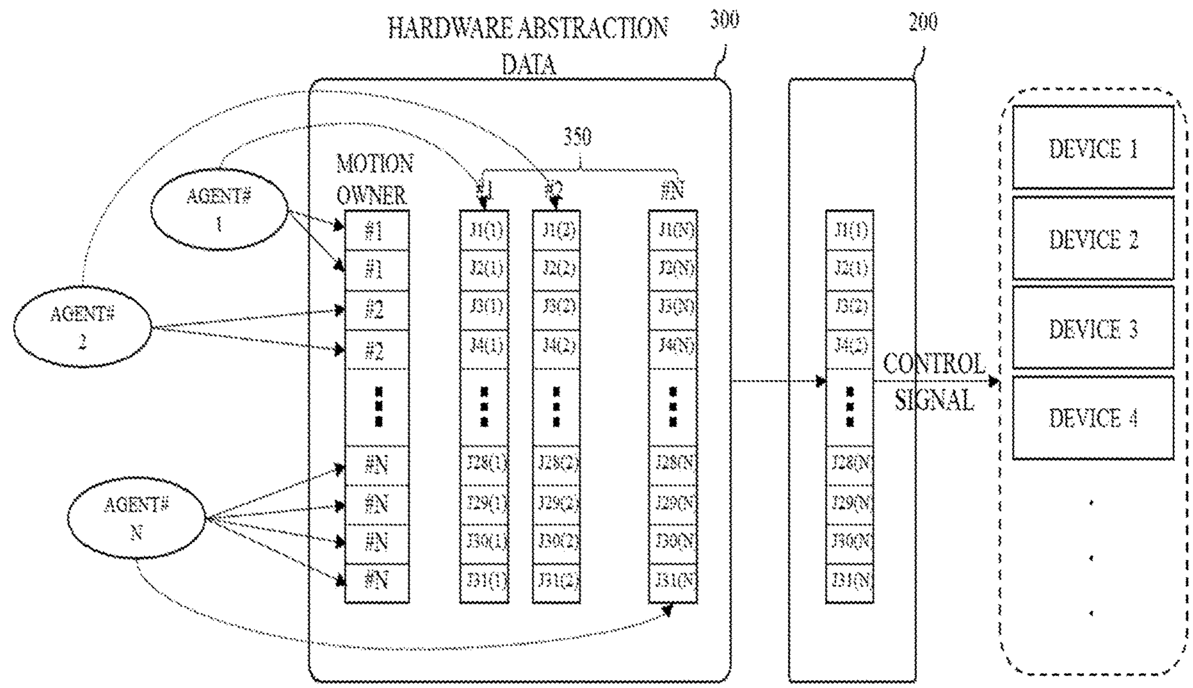
FIG. 5 is a diagram for explaining data exchange between the device control module and the agents according to an embodiment of the present invention.

And, FIG. 5 is a drawing for explaining data exchange between the device control module and the agents according to an embodiment of the present invention.

Hereinafter, a robot controlling system and a control method thereof of the present invention will be described in more detail in reference to FIG. 2 to FIG. 5.

Referring to FIG. 2, in a control method of a robot controlling system according to an embodiment of the present invention, firstly operation of a plurality of agents 400 having mutually independent processes may be performed (S101).

And, the device control module 200 may obtain hardware abstraction data from references stored in the shared memory 300 (S103).

And, the device control module 200 may generate control signals for hardware control from the hardware abstraction data (S107) and may transfer the generated control signals to one or more devices 100 (S109).

On the other hand, the device control module 200 may receive sensor data from the devices 100 corresponding to the sensor (S111) and may update the received sensor data into the shared memory 300 (S113).

And, the series of operation steps can be all processed within the first period corresponding to the real-time operation period of the robot controlling system, by which the real-time features can be guaranteed.

For the processes as described above, as shown in FIG. 3, each of the agents 400 and the device control module 200 may perform data exchange and transfer process using the shared memory 300.

The references corresponding to each of devices 100 may be stored in the shared memory 300 according to operation of each of agents 400, and the device control module 200 may obtain the references and may use it in outputting the control signals.

Such a plurality of agents 400 and the device control module 200 may construct a multi-agent system with the shared memory 300 as the center. Accordingly, each of parts performing independent work may be developed separately by several developers or may be co-worded, by which an advantageous structure at a robot controlling system develop environment may be obtained.

By using the agents 400 according to an embodiment of the present invention, the developers may be guaranteed with independent development space from a process concurrent development model, while mutual action on an operation result matter of other agents 400 or data giving and receiving may be enabled using the shared memory 300.

On the other hand, as shown in FIG. 4, the hardware abstraction data and the user-defined data may be included on the shared memory 300.

The hardware abstraction data may include sensor data, reference data, motion owner and command data, and the device control module 200 can access only to the hardware abstraction data area of the shared memory 300.

Accordingly, the device control module 200 may access to the hardware abstraction data area of the shared memory 300 to update sensor data received from the devices 100 or to obtain the updated reference data, to generate the control signals for the devices 100.

Here, the hardware abstraction data may have a data format converted with abstraction of detailed data on the robot device control, while the device control module 200 may convert this to an actual hardware control signals to be transferred to the proper devices 100.

Accordingly, a developer or a user of the agents 400 can control with ease without deep understanding on the hardware. The developer or the user may transfer an abstracted hardware input information to the references through the shared memory 300, while the device control module 200 may generate low level control signals for control of the devices 100 from the hardware abstraction data.

And, there may be an expandability of hardware and change and correction of hardware, for which the device control module 200 may manage hardware information needed in generating the control signals using above-mentioned hardware database 250. The hardware information may include, for example, a list of the devices 100, joint motor information (reduction gear ratio, encoder pulse, number of driver channels or the like), communication protocol or the like.

The device control module 200 may grasp hardware information of the drive target devices 100 by loading the hardware database 250, accordingly, may generate control signals optimal for control of the drive target devices 100. And, even when change of hardware occurs or hardware of new construction is used, adaptation can be enabled with only correction of the hardware database 250, by which a property strong to hardware change, and expandable in hardware can be provided.

And, the hardware abstraction data may include reference data, sensor data, motion owner and command data.

Here, the references data may be updated according to an operation result at each of agents 400 and may include an object value in current step so that the device control module 200 control the each of devices 100. For example, the reference data may include joint motion references and joint controller references And, the sensor data may include measurement data that the device control module 200 may receive from each of devices 100. Here, the measurement data may include, for example, status information at current step including encoder value and sensing data of the joint device.

On the other hand, the command data may include command information for control the device control module 200 and the agents 400 at upper system level and may include command target process information and parameter information.

On the other hand, there is no room for confusion in other data of the shared memory 300 since they are values read by the agents 400, while, in the case of reference data, values on the same joint device 100 outputted by each of agents 400 may differ. To eliminate the room of collision according to the above, the shared memory 300 may include motion owner information.

And, as shown in FIG. 5, the relationship between the motion owner and the reference data may be described in data exchange between the device control module 200 and the agents 400 according to an embodiment of the present invention.

As shown in FIG. 5, a memory area 350 by the agents 400 may be included at the hardware abstraction data area of the shared memory 300 where the reference data can be updated by each of agents 400.

Accordingly, each of agents 400 may update references calculated by oneself into a memory space area of oneself.

Here, each of agents 400 may operate and update reference data corresponding to each of devices 100. For example, in case that the joint devices 100 exist total 31 units as J1~J31, reference data area corresponding to the each of joint device 100 may be included at memory space area by each of agents 400.

At the same time, the shared memory 300 may include a motion owner variable for each of the joint devices 100. Therefore, motion owner variables of the same number as that of the joint devices 100 may be included at each of motion owner variable space.

And, each of motion owner variables may represent one agent having authority on a joint device 100 among a pre-set plurality of agents 400. Accordingly, the device control module 200 may judge at which agent 400 the control right for the corresponding joint device 100 is dependent.

And, the control right on each of the joint devices 100 may be transferred to another agent 400 or device control module 200 according to change of the motion owner variable.

For the above, the device control module 200 may firstly identify an agent 400 having control right of a specific joint device 100 from the motion owner variable. And, the device control module 200 may collect the reference data of the identified agent 400 and may couple the collected reference data to generate the whole reference data for the whole joint devices 100 constructed integrally.

And, the device control module 200 may generate control signals for each of devices 100 using the whole reference data to transfer it properly.

And after reviewing whether existing, the value of corresponding joint reference may be read, and by doing so, the references of the joint of the whole robot constructed as only one set integrally are constructed, which may be transferred to the robot device and may be driven.

Through the data exchange method as described above, each joints of the robot can be controlled without collision at different agents 400. For example, when the lower body joints are controlled through an algorithm for posture stabilization of low body at one agent 400, while a specific task motion of upper body is generated at another agent 400, an entire body task of robot may be performed by integrating the results of two agents 400. This may enable an efficient control suitable for property of multi-agent system of the robot.

Figure 6:
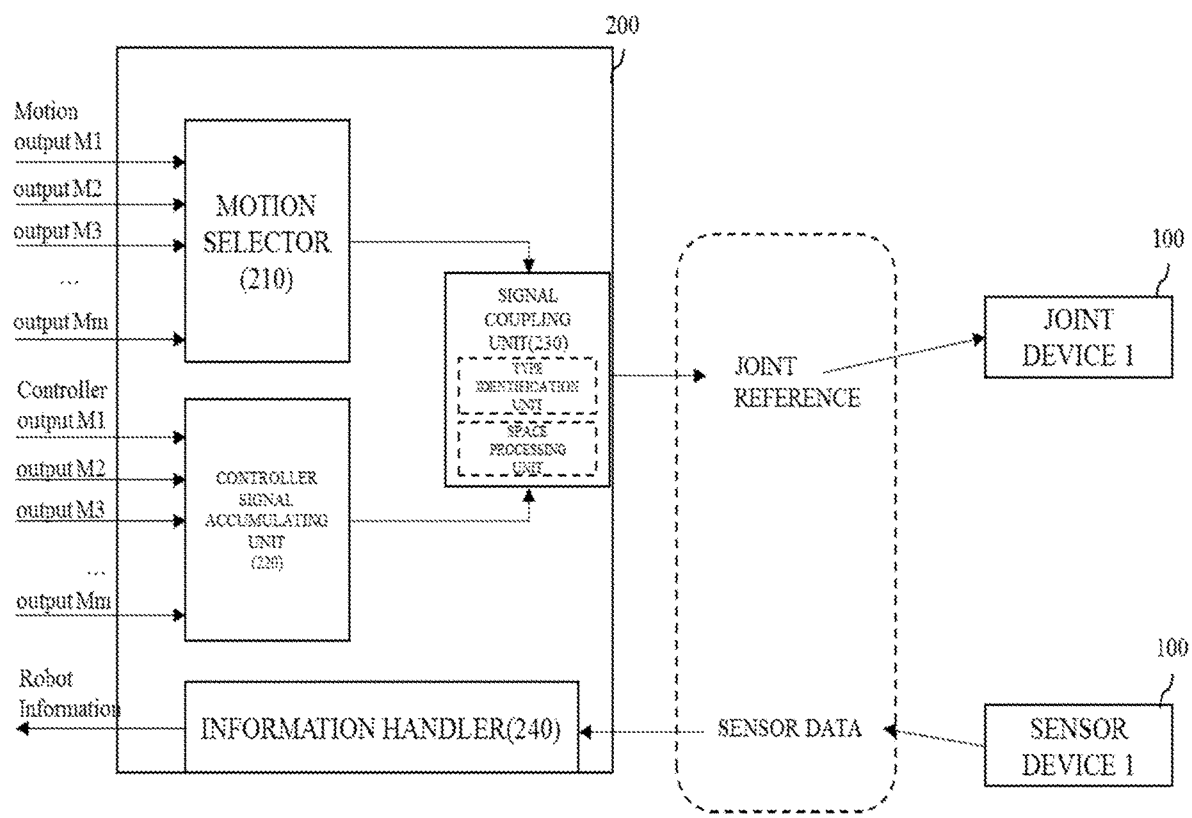
FIG. 6 is a block diagram for explaining the device control module according to an embodiment of the present invention.

FIG. 6 is a block diagram for explaining a device control module according to an embodiment of the present invention.

Referring to FIG. 6, the device control module 200 may include a motion selector 210, a controller signal accumulating unit 220, a signal coupling unit 230, and an information handler 240.

According to an embodiment of the present invention, the reference data for the joint may include two or more reference signals for joint motion control and detailed control. Accordingly, the agent 400 corresponding to each of joint devices 100 may generate two or more reference signals as reference data to store into the shared memory 300.

And, as shown in FIG. 6, the reference signals may be called as motion reference and controller reference. The motion reference may include reference data providing dominant value to each of joints, while the controller reference may include detailed reference data microscopically increased or decreased to the motion reference. However, the references in embodiments of the present invention is not limited to the designation thereof.

Accordingly, motion reference output data (M1~Mm) and controller reference (M1~Mm) may be inputted from the shared memory 300 to the device control module 200.

And, the motion reference may be selected as one per one joint device 100, but the controller reference may be accumulated all with addition and subtraction.

For the above, the motion selector 210 may select motion reference data corresponding to each of joint devices 100 from the motion reference data based on the motion owner variable information and may output the same to the signal coupling unit 230. Therefore, one motion reference data may be selected at one joint device 100.

And, the controller signal accumulating unit 220 may accumulate each of controller reference data regardless of the motion owner variable to output the result value to signal coupling unit 230.

And, the signal coupling unit 230 may synthesize the accumulated result value of the motion reference data and the controller reference data, may generate the final reference data by joint device 100, and may output it to a proper target joint device 100.

Here, the signal coupling unit 230 may identify the type of the reference and may distinguish process spaces according to the reference types. For the above, the signal coupling unit 230 may include type identification unit and space processing unit.

For example, the reference data may have not only joint operation but also other type such as task process, and accordingly, the type identification unit may identify the task type or whether joint type, and the space processing unit may provide process of other data space each other according to the type.

As described above, by separating the motion reference and the controller reference, a functional separation can be enabled at process generating the robot motion. For example, when generating motion of biped walking, one agent 400 may generate a basic walking pattern to generate motion reference, another agent 400 may design a damping controller, and further another agent 400 may design a controller reducing vibration, and by outputting as controller reference, very easy design and development may be enabled.

On the other hand, the information handler 240 may integrate sensor data collected from sensor device 100 or other measurement target devices and may perform function of outputting to the shared memory 300.

Figure 7:
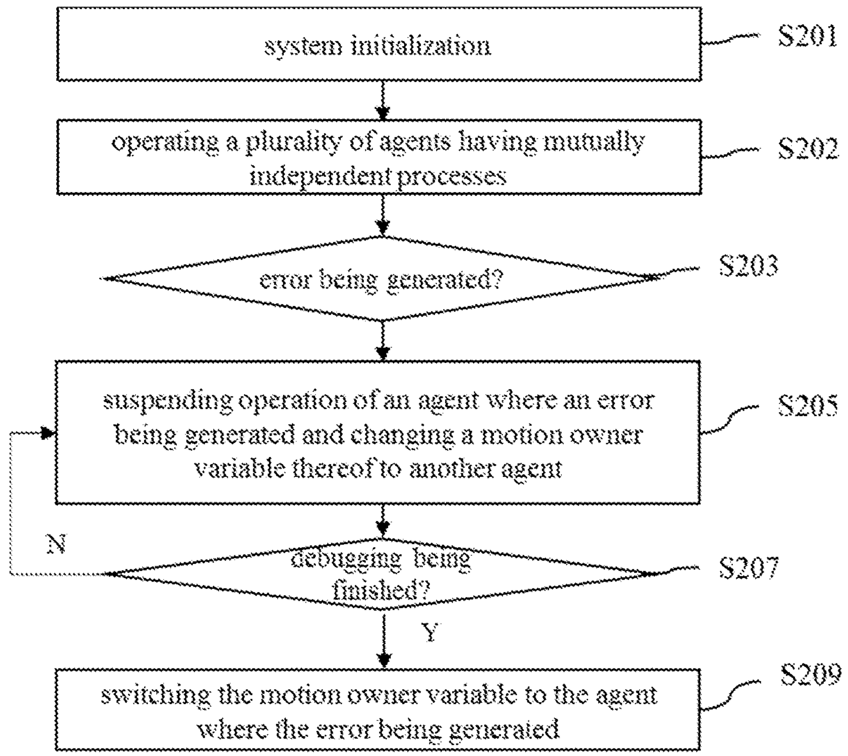
FIG. 7 is a flow chart for explaining control operation of the robot controlling system according to another embodiment of the present invention.

FIG. 7 is a flow chart for explaining control operation of the robot controlling system according to another embodiment of the present invention.

In general, when a problem occurs in an actual experiment using a robot, the robot should be driven from the first again. The robot initialization process may be simple in case of mobile platform, while, in case of multi-joint system as in humanoid, or in case that initialization on the ground is difficult to be performed and initialization needs to be performed in midair using crane or the like, the whole initialization process may be very cumbersome and may require a plenty of time.

Accordingly, as shown in FIG. 7, the device control module 200 according to an embodiment of the present invention can debug and test the robot again without process of such initialization of the robot.

For the above, firstly the system initialization may be performed (S201), and each of a plurality of agents 400 having mutual independent processes may be operated (S202).

After then, in case that a specific agent exists where an error is generated (S203), the operation of the agent where the error is generated may be suspended and the device control module 200 or other agent 400 may change the motion owner variable to another agent (S205).

Accordingly, when a problem occurs while a user tests motion algorithm through the agents 400, the motion owner may only be turned over to another agent 400 or device control module 200 and the code for the suspended agent 400 can be corrected.

And, in case that the prepared code is compiled, and the debugging is finished (S207), the motion owner variable may be switched to the original agent 400 again (S209).

As described above, a developer may continue experiment after bringing the motion owner. This may accelerate development as a result, and the user may, with further utilizing the above, may enjoy an effect that robot may be experimented in safety by observing the joint reference of the robot continuously at other specific AL to detect the occurrence of collision, and in case of generation of collision, by switching the motion owner.

Figure 8:
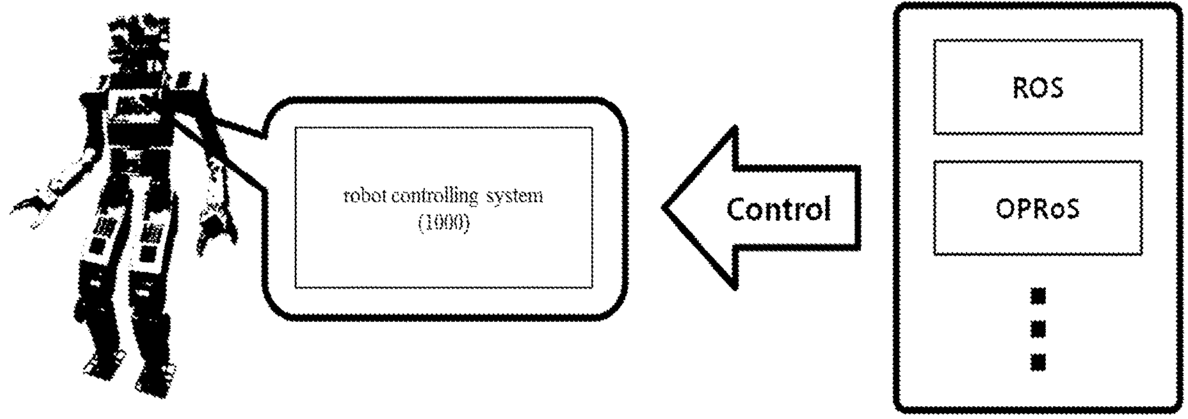
FIG. 8 is a drawing for explaining a layer design and operation environment according to an embodiment of the present invention.

FIG. 8 is a drawing for explaining operation environment of a robot system according to an embodiment of the present invention.

According to an embodiment of the present invention, a robot software may be used in general purpose, for which the software should be able to operate a plurality of variety of robots not only one robot platform. Therefore, there is a need that it should be expandable and adaptable to change in robot hardware and it can be controlled not only by actual robot platform but also by software like robot simulators.

Accordingly, a robot controlling system 1000 according to an embodiment of the present invention may build a general-purpose system which can use functions of other useful robot middleware like ROS (Robot Operation System) of U.S.A. or OPRoS (Open Platform for Robotics Services) of Korea. Accordingly, an environment by which a variety of vision solutions or functions managing tasks of robot provided by software on a cloud robot system can be applied to a system of the present invention with ease may be provided.

For the above, when each of agents 400 of the robot controlling system 1000 may generate a motion, the device control module 200 controlling each of the robot devices 100 may be operated to be able to provide a real-time control of the whole system. And, a reference of connection or determination between motions may be suggested or several robots may be managed concurrently by other robot software of upper level.

Figure 9:
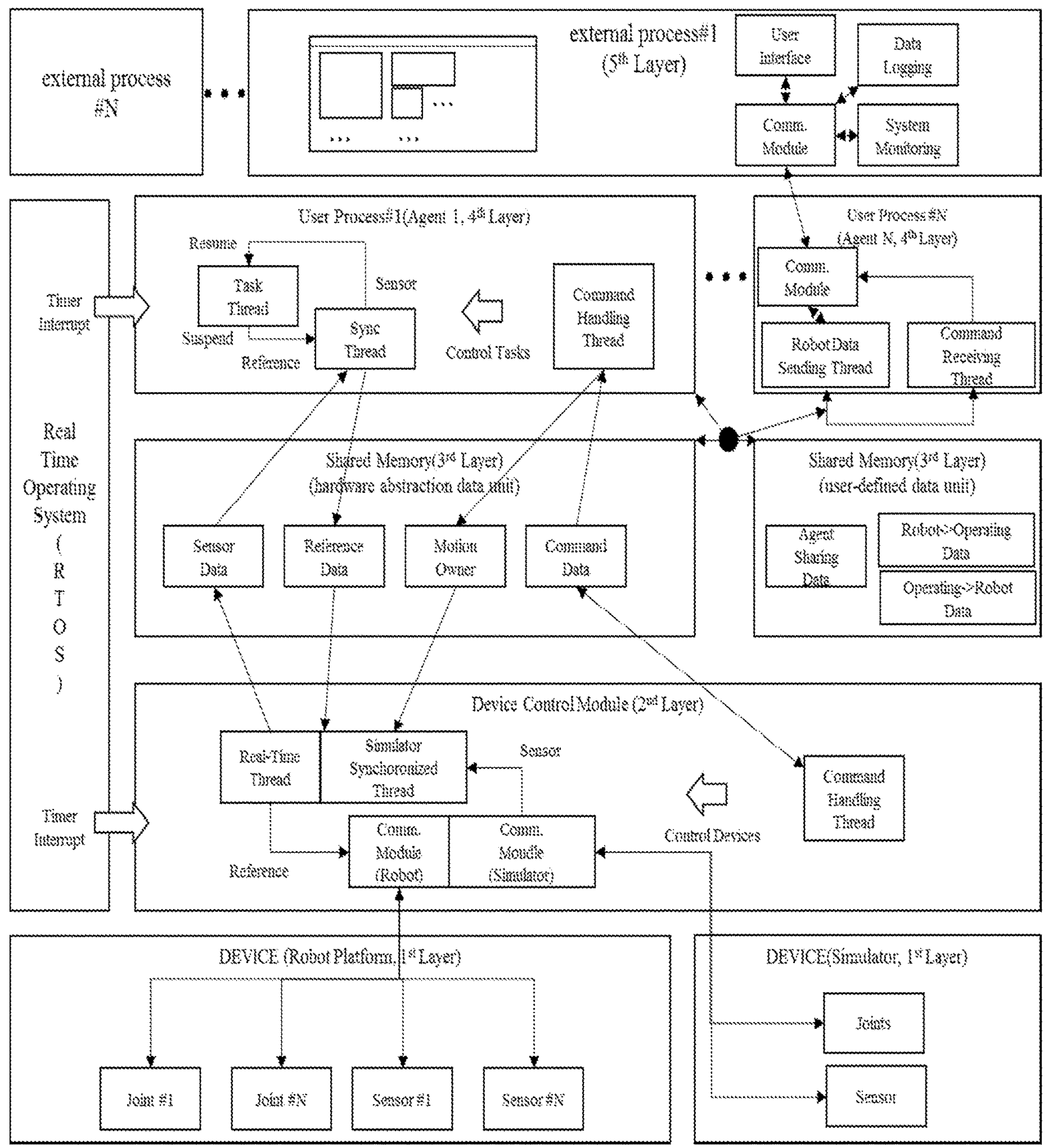
FIG. 9 is a drawing showing a hierarchical architecture design of a robot system according to an embodiment of the present invention.

This may be described in more detail by a hierarchical architecture of the robot controlling system 1000 described with FIG. 9.

FIG. 9 is a drawing showing a hierarchical architecture design of a robot system according to an embodiment of the present invention.

The robot controlling system 1000 may include a layered structure of each of data process modules to provide an environment by which another general external process as above can access to a plurality of agents according to an embodiment of the present invention or can generate arbitrary agent to operate independently.

And, each of the layered structure may be connected to the robot controlling system 1000 or may be realized in software or hardware on a real-time operating system (RTOS) where the robot controlling system 1000 is loaded or installed. And, for synchronization of operation period between each of layers, the real-time operating system may provide a global Timer Interrupt to the fourth layer and the second layer.

For example, each of agents of the fourth layer may be implemented as a process of the real-time operating system, which may access to the shared memory, may obtain sensor data, and may store reference data according to thread operation included in the process. And, the device control module of the second layer synchronized to the above may store sensor data of the devices to the shared memory and may generate device control signals according to reference data and motion owner of the shared memory to output to each of devices according to thread operation on the real-time operating system.

The robot controlling system 1000 according to an embodiment of the present invention which can be realized on the real-time operating system as described above may be constructed in a hierarchical architecture comprising a first layer comprising one or more control target devices (joints or Sensors) included in a robot platform or a simulator; a second layer comprising a device control module controlling directly the devices at upper level of the first layer; a third layer comprising a shared memory connected to the device control module at upper level of the second layer; a fourth layer comprising one or more agents performing independent processes using the shared memory at upper level of the third layer; and a fifth layer controlling the one or more agents according to user commands at upper level of the fourth layer.

Here, each of communication protocol may be set in advance so that the first to fifth layers can communicate only between layers adjacent mutually. Each of layers can access next layer thereof only through upper or lower layers, by which a stabilized and systematic system can be maintained through a controlled system like above.

Firstly, each of devices may be included in the first layer. The devices may include low level robot devices which are actual targets of control, wherein, for example, controller of driver, or devices of sensor board or robot simulator may be included.

And, the device control module 200 may always reside in the second layer as background to be executed to control the robot. The second layer may be the only layer which can control directly the devices of the robot system.

For example, the device control module of the second layer may transfer the references of joint generated from the shared memory to the robot device, and contrarily, may obtain value of sensor from the device. The second layer may be operated by a real-time thread generated from a real-time operating system (RTOS), wherein the thread of the second layer may have a period synchronized to the control period of motion generation. In case that the device is interlinked to the simulator, the thread of the second layer may be operated with synchronization to time of the simulator. The second layer may have a non-real-time thread which can read in and interpret commands, wherein the non-real-time thread may receive and process other commands at a spare time in the real-time thread.

Accordingly, the device control module may have a hierarchical architecture which may reside in background of the system to transfer control signals for controlling the devices from the references obtained from the shared memory to the first layer.

On the other hand, the third layer may include a hardware abstraction data unit and a user-defined data unit as a shared memory layer. As shown in FIG. 9, hardware abstraction data described above may be included in the hardware abstraction data unit, wherein the kind of the hardware abstraction data may include sensor data, reference data, motion owner and command information. The device control module of the second layer can be connected only to the shared memory of the third layer.

On the other hand, the user-defined data unit may store temporarily or permanently an agent shared data shared between processes of a plurality of agents existing on the fourth layer and a robot drive data according to user definition.

And, the fourth layer is a layer to drive processes of each of agents so that a user of an external process may generate a robot motion of one's own or the like, wherein the agent processes may be called specifically as ALs since they are executed mutually independently within the layer as each of grapes in a bunch. The each of agents may read sensor data from the shared memory of the third layer mutually independently to generate motion and may update the joint reference of the generated motion into the shared memory.

And, the agent processes of the fourth layer may set which AL has the ownership for the reference of the corresponding joint to the motion owner.

And, each of agents may generate a rapid real-time thread of very short period from the real-time operating system (RTOS), wherein the rapid thread may be used in synchronization of a motion generation thread of each of agents to the above-mentioned real-time thread of the device control module of the fourth layer. For example, the thread generating motion may be synchronized real-time with the device control module by the rapid thread, by which an operation may be Resumed at the same time of synchronization, while may be Suspended after sequencing loop of reference operation once. The control of the robot controlling system 1000 may be implemented by repeatedly and continual occurrence of this operation.

Here, not all the agents generate directly the motion of the robot, but there may be an agent taking the motion owner from other agent when sensing collision to make the robot safe and there may be an agent which can perform a subordinate process helping other agents, can be implemented as a communication module (comm. module) to send and receive information with the fifth layer to do a role to control other agents (agent N in FIG. 9).

On the other hand, the fifth layer may include a user interface module providing functions of control corresponding to the agents and of monitoring on the robot controlling system 1000.

Accordingly, the fifth layer may include a variety of processes for providing convenience in controlling the robot. For example, a GUI (Graphic User Interface) for easy command or monitoring or logging program storing data may be included in the fifth layer.

And, the fifth layer may provide one or more interface functions that robot middleware like conventional ROS and OPRoS may control agents, which is an accessible area of external process.

And, there may exist other robot controlling system of upper level which may control the robot controlling system 1000 of lower level through the fifth layer. Accordingly, the robot controlling system 1000 may include a structure which can expend infinitely through the fifth layer, through which a structural possibility controlling a hyper multi-agent system may be provided.

On the other hand, the system and the methods according to the present invention described above may be produced as a program for execution on a computer and stored in a recording medium readable by a computer, wherein examples of recording medium readable by the computer may include ROM, RAM, CD-ROM, magnetic tape, floppy disk, light data storage apparatus and the like, to which something realized in a form of carrier wave (for example, transmission through internet) may be included.

The recording medium readable by the computer may be distributed in a computer system connected by network and the code readable by the computer may be stored and executed in a distributive way. And, the functional (function) program, code and code segments to realize the method may be inferred by programmers of the technical field where the present invention pertains with ease.

And, even though some desirable embodiments of the present invention have been described above, the present invention may not be limited to the above-mentioned specific embodiments, but also of course a variety of modified realization may be possible by a person having an ordinary knowledge in the technical field where the present invention pertains without escaping from the gist of the present invention written in claim, and these modified implements should not be appreciated as separate from the technical idea or perspective of the present invention.

What is claimed is:

1. A real-time device controlling system having a hierarchical architecture comprising:

a first layer comprising one or more control target devices;

a second layer comprising a device control module controlling directly the one or more control target devices at an upper level of the first layer;

a third layer comprising a shared memory connected to the device control module at an upper level of the second layer;

a fourth layer comprising one or more agents performing independent processes using the shared memory at an upper level of the third layer; and a fifth layer controlling the one or more agents according to user commands at an upper level of the fourth layer, wherein the device control module is a module generating a real-time thread having a control period synchronized to the one or more agents on an operating system connected to the real-time device controlling system.

2. The real-time device controlling system of claim 1, wherein the first to fifth layers are configured to communicate with mutually adjacent layers.

3. The real-time device controlling system of claim 1, wherein the device control module of the second layer resides in a background of the real-time device controlling system and transfers control signals for controlling the one or more control target devices from a reference obtained from the shared memory to the first layer.

4. The real-time device controlling system of claim 1, wherein the shared memory comprises:

a hardware abstraction data unit storing information for operation of the device control module of the second layer; and a user-defined data unit storing agent shared data shared among the one or more agents of the fourth layer.

5. The real-time device controlling system of claim 1, wherein each of the one or more agents of the fourth layer generates a real-time thread on a real-time operating system connected to the system, and wherein an operation period of the real-time thread is synchronized to the device control module.

6. The real-time device controlling system of claim 1, wherein the fifth layer comprises a user interface module providing control and monitoring function corresponding to the one or more agents.

7. A real-time robot controlling system comprising:

one or more control target devices corresponding to a joint or a sensor of a robot; and a control system connected to the one or more control target devices to operate the one or more control target devices, wherein the control system comprises:

a first layer comprising the one or more control target devices;

a second layer comprising a device control module controlling directly the one or more control target devices at an upper layer of the first layer;

a third layer comprising a shared memory connected to the device control module at an upper layer of the second layer;

a fourth layer comprising one or more agents performing independent processes using the shared memory at an upper layer of the third layer; and a fifth layer controlling the one or more agents according to user commands at an upper layer of the fourth layer, wherein the control system operates the one or more control target devices using communication between the layers mutually adjacent to each other, and wherein the device control module is a module generating a real-time thread having a control period synchronized to the one or more agents on an operating system connected to the robot controlling system.

8. The real-time robot controlling system of claim 7, wherein the device control module of the second layer resides in a background of the control system and transfers control signals for controlling the one or more target devices from a reference obtained from the shared memory to the first layer.

9. The real-time robot controlling system of claim 7, wherein the shared memory comprises:

a hardware abstraction data unit storing information for operation of the device control module of the second layer; and a user-defined data unit storing agent shared data shared among the one or more agents of the fourth layer.

10. The real-time robot controlling system of claim 7, wherein each of the one or more agents of the fourth layer generates a real-time thread on a real-time operating system connected to the system, and wherein an operation period of the real-time thread is synchronized to the device control module.

11. The real-time robot controlling system of claim 7, wherein the fifth layer comprises a user interface module providing a control and monitoring function corresponding to the one or more agents.

* * * * *